(12) United States Patent
Leymann et al.

(10) Patent No.: US 6,487,548 B1
(45) Date of Patent: Nov. 26, 2002

(54) USING DATABASE QUERY TECHNOLOGY FOR MESSAGE SUBSCRIPTIONS IN MESSAGING SYSTEMS

(75) Inventors: Frank Leymann, Aidlingen; Dieter Roller, Schönaich, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/305,987

(22) Filed: May 6, 1999

(30) Foreign Application Priority Data

May 8, 1998 (EP) .............................................. 98108425

(51) Int. Cl.[7] .............................................. G06F 17/30
(52) U.S. Cl. .............................. 707/3; 707/10; 707/104; 707/103; 709/206; 709/217
(58) Field of Search .................... 707/1–10, 100–104.1, 707/200–203, 501, 205; 345/333; 705/7, 9, 38; 709/206, 217, 202, 315, 229, 246

(56) References Cited

U.S. PATENT DOCUMENTS 5,457,797 A * 10/1995 Butterworth et al. ....... 709/320
5,893,904 A * 4/1999 Harris et al. ................... 705/27
5,937,162 A * 8/1999 Funk et al. .................. 709/206
5,995,947 A * 11/1999 Fraser et al. ................... 705/38
6,012,067 A * 1/2000 Sarkar ......................... 707/103
6,061,681 A * 5/2000 Coolins ........................... 707/5

* cited by examiner

Primary Examiner—John Breene
Assistant Examiner—Mohammad Ali
(74) Attorney, Agent, or Firm—Gunster, Yoakley, Valdes-Fauli & Stewart; Stephen Bongini

(57) ABSTRACT

The present invention relates to messaging systems in general and message broker systems in specific. More particularly, the invention relates to means and a method for processing message publication requests and message subscription requests.

Figure 1:
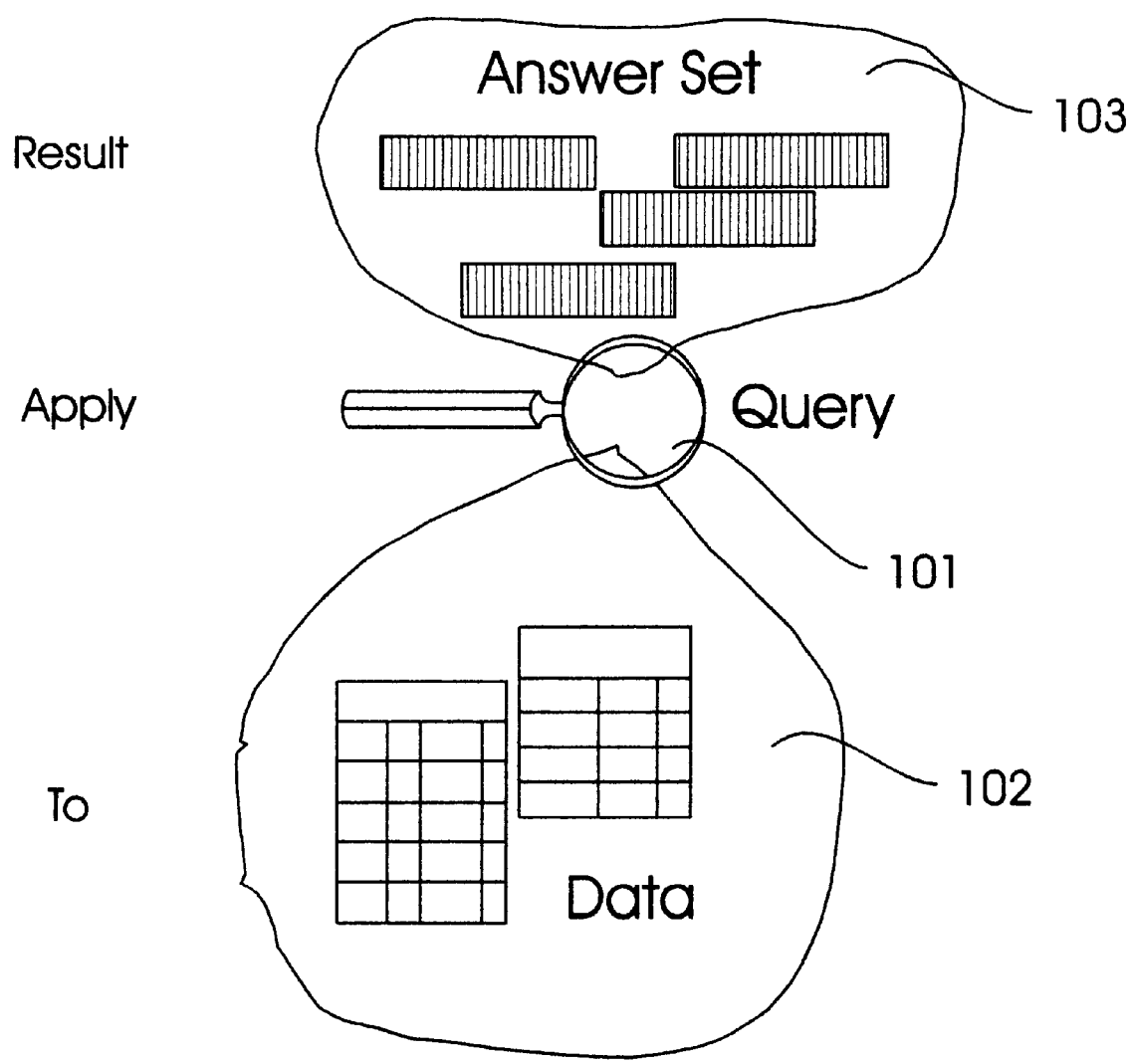

The current invention transforms the subscription problem into a database query problem allowing to use query techniques known and optimized for many years. The basic approach of the current invention is to invert the relationship of message publication requests (treated as database data) and message subscription requests (treated as database queries) according the state of the art. Thus the core of the current invention is to treat incoming messages publication requests as database queries and to treat message subscription requests as database queries.

20 Claims, 3 Drawing Sheets

USING DATABASE QUERY TECHNOLOGY FOR MESSAGE SUBSCRIPTIONS IN MESSAGING SYSTEMS

1 BACKGROUND OF THE INVENTION

1.1 Field of the Invention

The present invention relates to messaging systems in general and message brokers in specific. More particularly, the invention relates to means and a method for processing message publication requests and message subscription requests.

1.2 Description and Disadvantages of Prior Art

One source of technology the current invention is based on is the database technology. For a thorough outline of the principles and concepts of database technology refer for instance to R. Elmasri and S. B. Navathe, Fundamentals of database systems, 1989, Benjamin/Cummings. Of specific importance to the current invention is the fundamental concept of a query of database technology. A query is a request to a database system to retrieve from a database a collection of data qualifying under the query; this collection is called the answer.set of the query. Typically, the database contains data about real-world entities like persons, orders, appointments etc. A query is a prescription for selecting subsets from these entities, possibly combine some of them, and present them in a certain form.

Another source of technology the current invention is based on is the technology messaging systems or message brokers in specific. A messaging system or a message broker is like a hub where messages are streaming in, are transformed, and are streaming out. Messaging systems offer the passing of messages through a store-store-and-forward funcionality. Message brokers in addition also allow to reduce the connection costs by supporting the many-to-many communication principle comprising the one "source-message" vs. multiple "sink-message" communication case. Compared to messaging systems a message broker might be augmented by related services like: a message transformer, flow controller, message warehouse, message dictionary and management facility.

The messages which are streaming into the messaging system/broker are referred to as being published. Messages which are streaming out of the messaging system/broker are referred to as being subscribed. A publication request specifies a message a certain application intends to offer to other interested applications, i.e. to subscribers. A subscription request specifies the subset of all incoming messages a particular application is interested in, and the format in which it has to be presented to the subscriber. An overview on messaging systems and message brokers is given in R. Schulte, Message brokers: A focussed approach to application integration, Gartner Group, Strategic Analysis Report SSA R-401-102, 1996 as well as in "Enterprise application integration and information flow", The Yankee Group—Internet Computing Strategies (Boston Mass., 1997).

Thus, a subscription request is similar to what has been described above as a "query" in terms of database technology. And exactly in this sense current state of the art messaging systems and message brokers do treat subscription requests. Expressed in database terms the "messages" are treated as "database data" and the "subscriptions request" are treated as "query" operating on that data filtering out the subscribed messages; i.e. based on its specification messages are filtered, transformed and delivered to its requester. State-of-the-art implementations (for instance the Gryphon approach of IBM Watson Research) use techniques like variants of binary trees to represent subscription requests and process incoming messages accordingly for filtering.

So far specific implementations for messaging systems and message brokers of these administrations and filtering tasks of message publication and subscription requests have been required. No exploitation of general purpose technologies delivering performant solutions has been possible so far.

The message broker paradigm is about to gain increased importance in the area of application integration. Its implementation therefore has to be further improved to be able to support the huge diversity of application needs.

1.3 Objective of the Invention

The invention is based on the objective to improve the processing of message publication requests and message subscription requests within messaging systems in general and message brokers in specific.

2 SUMMARY AND ADVANTAGES OF THE INVENTION

The objective of the invention is solved by the independent claims.

The objective of the invention is solved by claim 1. A messaging system is taught comprising first receiving means for receiving a message publication request comprising a message to be published. Said messaging system comprising second receiving means for receiving one or a multitude of message subscription requests comprising a query on a message qualifying under said query. Further a database (301) is comprised. Said second receiving means treats said message subscription request as database data and stores said message subscription request to said database (301). Said first receiving means treats said message publication request as a database query (302) and retrieves from said database a collection (303) of message subscription requests qualifying under said database query.

The technique proposed by the current invention makes database technology available to messaging systems. In database environments a query operates on a large amount of data, but in a message broker environment a large amount of queries (corresponding to a message subscription) operate on a single data item (corresponding to a publication of a message). Due to this circumstances database technology could not be exploited in a performant manner by messaging systems. Moreover the current teaching significantly simplifies the implementation of messaging systems as an exploitation of the mature, sophisticated and high performant database technology is possible; no implementation specific to messaging systems is required.

Through the transformation of the subscription problem into a database query problem the current invention allows to use query techniques known and optimized for many years. All advantages and benefits provided by database technology are immediately available to messaging systems, like persistency, recovery features, transactional behavior and many more. For a broad spectrum of business problems, no new algorithms must be invented and existing implementations can be reused. All these advantages are of specific value within messages systems required to provide high reliability against data losses and high availability.

Additional advantages are accomplished by claim 2. According to a further embodiment of the proposed invention said second receiving means transforms a message subscription request into a database data representation.

By explicitly transforming a message subscription into a specific data representation the efficiency (for instance in terms of the amount of data to be stored or in terms of performance to process a later query for that data etc.) of the current approach can be increased further.

Additional advantages are accomplished by claim 3. According to a further embodiment of the proposed invention said first receiving means transform said message publication request into a database query.

Through such a transformation, which may be adjusted to the transformation of the subscription according to claim 2, into a specific query representation the efficiency of the current approach can be increased further.

Additional advantages are accomplished by claim 4. According to a further embodiment of the proposed invention said first receiving means store said message into said database or into a separate message database.

Using database technology also for the messages allows to profit from the database technology benefits for the message request too; examples are: the recovery features after system crashes, atomicity, integrity etc. Moreover through this feature the door to message warehousing is opened.

Additional advantages are accomplished by claim 5. According to a further embodiment of the proposed invention the current teaching is applied to a message broker and/or a message warehouse.

Through its universality the current teaching may be applied in various areas.

Additional advantages are accomplished by claim 6. According to a further embodiment of the proposed invention said database may be stored in main memory and/or on persistent memory.

Again this demonstrates the flexibility of the teaching; messaging systems, for which the response time behavior is the primary requirement and which will store the database within main memory, as well as messages systems, for which reliability against data losses is the primary requirement and which will store the database on persistent memory, may exploit the proposed technology.

Additional advantages are accomplished by claim 7. According to a further embodiment of the proposed invention said database may be a relational database or a hierarchical database or a network database or an object-oriented database or a collection of flat files.

Thus the current teaching is applicable to any type of database. The teaching does not limit the exploiter to a certain database technology; instead other criteria, for instance maturity, availability of the database technology or the type of data to be stored within the database, may decide on the database type to be selected.

Additional advantages are accomplished by claim 8. According to a further embodiment of the proposed invention the messaging system is comprising sending means for sending said message to subscribers of said collection of message subscription requests.

Thus the message comprised in the message publication request and serving as the database query can finally be sent to all subscribers of that particular message or that message type.

The objective of the invention is solved by claim 9. A method of processing a message publication request is being taught comprising a message to be published, and one or a multitude of message-subscription-requests comprising a query on a message qualifying under said query. Said method comprises the following steps: 1) a first step of treating said message subscription request as database data and storing said message subscription request to said database (301), and 2) a second step of treating said message publication request as a database query (302) and retrieving from said database a collection (303) of message subscription requests qualifying under said database-query.

Benefits related to this teaching have been discussed together with claim 1 above.

Additional advantages are accomplished by claim 10. According to a further embodiment of the proposed invention said first step is preceded by a subscription transformation step wherein said message subscription request is transformed into a database data representation.

Benefits related to this teaching have been discussed together with claim 2 above.

Additional advantages are accomplished by claim 11. According to a further embodiment of the proposed invention said second step is preceded by a message transformation step wherein said message publication request is transformed into a database query.

Benefits related to this teaching have been discussed together with claim 3 above.

Additional advantages are accomplished by claim 12. According to a further embodiment of the proposed invention said first step stores said message into said database or into a separate message database.

Benefits related to this teaching have been discussed together with claim 4 above.

Additional advantages are accomplished by claim 13. According to a further embodiment of the proposed invention said method is executed by a message broker and/or wherein said database is part of a message warehouse.

Benefits related to this teaching have been discussed together with claim 5 above.

Additional advantages are accomplished by claim 14. According to a further embodiment of the proposed invention said method is storing said database in main memory and/or on persistent memory.

Benefits related to this teaching have been discussed together with claim 6 above.

Additional advantages are accomplished by claim 15. According to a further embodiment of the proposed invention said database is a relational database or a hierarchical database or a network database or an object-oriented database.

Benefits related to this teaching have been discussed together with claim 7 above.

Additional advantages are accomplished by claim 16. According to a further embodiment of the proposed invention said method is further comprising a third step of sending said message to subscribers of said collection of message subscription requests.

Benefits related to this teaching have been discussed together with claim 8 above.

3 BRIEF DESCRIPTION OF THE DRAWINGS

FIG. 1 is a diagram reflecting the query concept according database technology.

Figure 2:
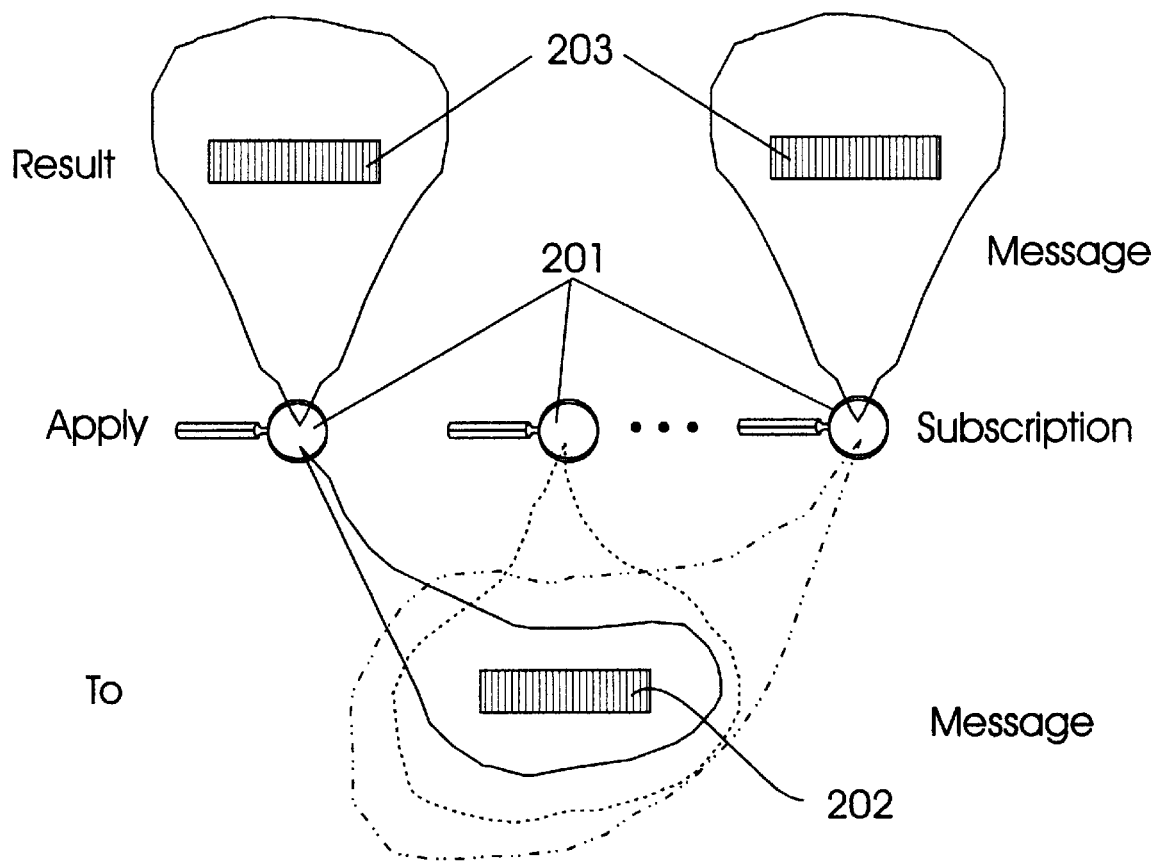

FIG. 2 visualizes the relationship and the handling of message publication requests and message subscription requests according to the current state of the art of messaging systems.

Figure 3:
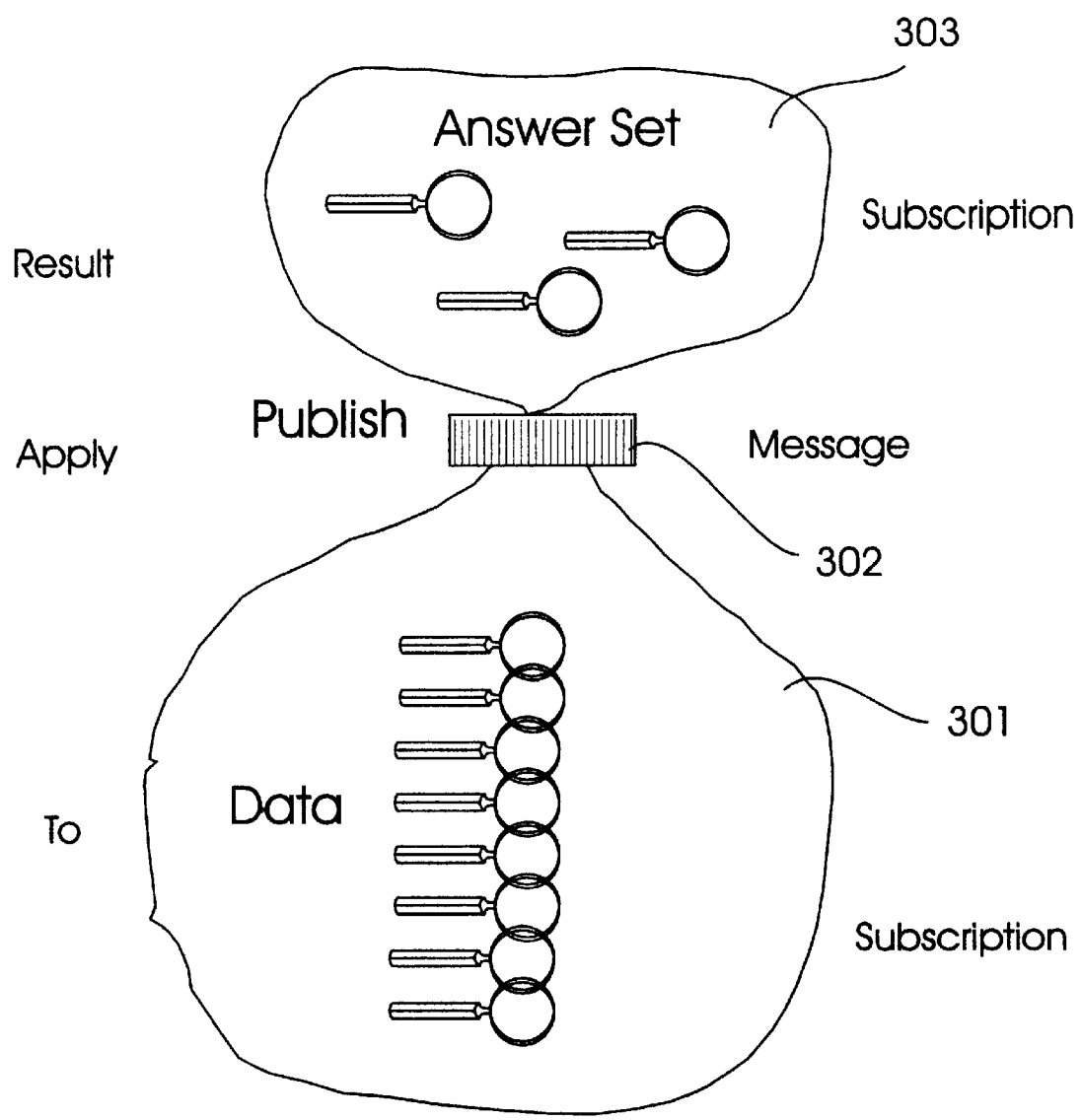

FIG. 3 depicts the relationship and the handling of message publication requests and message subscription requests according to the current invention and applicability of database technology.

4 DESCRIPTION OF THE PREFERRED EMBODIMENTS

If the current specification is referring to a database this term includes any type of database system, like for example relational databases, hierarchical database, network databases or object-oriented databases; the invention is not limited to a specific database system type. Moreover for the sake of the current invention the data model of the database system is irrelevant. Also, the database system might manage persistent data on disk and/or might manage data in main memory (i.e. a main memory database).

This teaching does not impose any limitations to the nature of a message or the type of subscription. Moreover the term "message" is to be understood from a logical perspective. The actual communication middleware may transfer the message using the connection-oriented or the connectionless paradigm; the invention is not limited to any of these paradigms.

The current invention relates to messaging systems as well as message brokers. Therefore if features of the invention are described within this specification in the context of message brokers only the teaching may also be applied to messaging systems and vice versa.

4.1 Introduction

Of specific importance to the current invention is the fundamental concept of a query of database technology, which is depicted in FIG. 1. A query (101) is a request to a database system to retrieve from a database (102) a collection of data qualifying under the query; this collection is called the answer set (103) of the query. Typically, the database contains data about real-world entities like persons, orders, appointments etc. A query is a prescription for selecting subsets from these entities, possibly combine some of them, and present them in a certain form.

A messaging system or a message broker is like a hub where messages are streaming in, are transformed, and are streaming out. Messaging systems offer the passing of messages through a store-store-and-forward funcionality. Whereas message brokers in addition also allow to reduce the connection costs by supporting the many-to-many communication principle. The messages which are streaming into the messaging system/broker are referred to as being published. Messages which are streaming out of the messaging system/broker are referred to as being subscribed. A publication request specifies a message a certain application intends to offer to other interested applications, i.e. to subscribers. A subscription request specifies the subset of all incoming messages a particular application is interested in, and the format in which it has to be presented to the subscriber. Message brokers also may support message dictionaries to hold metadata descriptions of messages for development purposes for instance, and administration and monitoring tools to manage the operation of the broker configuration.

For example, various stock exchanges might publish stock data periodically, i.e. the stock data is send to the message broker. Each stock exchange might use a different format to transfer its data. A subscriber has registered to all messages about IBM stock data exceeding $103 and requests its delivery in XML (eXtended Markup Language) format.

Thus, a subscription request is similar to what has been described above as a "query" in terms of database technology. And exactly in this sense current state of the art messaging systems and message brokers do treat subscription requests. A visualization of this state of the art is given in FIG. 2. Expressed in database terms the "messages" (202) are treated as "database data" and the "subscriptions request" (201) are treated as "query" operating on that data filtering out the subscribed messages (203); i.e. based on its specification messages are filtered, transformed and delivered to its requester. State-of-the-art implementations (for instance the Gryphon approach of IBM Watson Research) use techniques like variants of binary trees to represent subscription requests and process incoming messages accordingly for filtering.

Messaging systems and/or mesage broker support request/reply and/or event-based communication depending on whether the communication is initiated by the a source or a sink application. A sink asks the system for data and the system fulfills the request. In event-based communication communication is source driven. The message is generated by the source and passed to the system for relaying to the sinks. The current invention applies to both communication models.

4.2 Further Analysis of the Publish-Subscribe Problem Area

The following two problem areas can be identified and are addressed by the current invention.

4.2.1 Many-Queries-Single-Data-Item Characteristic

Within the are of messaging systems typically many applications have subscribed with a message broker corresponding to many different queries which have to be processed for each incoming message; i.e. message subscriptions requests correspond to database queries. Thus, the situation is the opposite as in database environments: In the latter environments a query operates on a large amount of data, but in a message broker environment a large amount of queries operate on a single data item. Extensive caching of messages can be helpful here, but even if applied to the current situation, the fundamental characteristics, "relatively" small number of messages (database data) versus "relatively" large number of message subscriptions (database queries), is not reversed. Current query processing algorithms within messaging systems do not address this situation, thus, new algorithms must be invented or algorithms from other areas must be applied in this situation.

4.2.2 Subscriptions In Message Warehousing

In another class of message broker applications the storage of published messages is required resulting in a so-called message warehouse. In this situation, performing the filtering outside of the database as before seems to be unnatural since the database functionality is already part of the overall environment.

A first step for improvement in this problem area is to store the message in the database before satisfying the subscriptions. Subscriptions will then be transformed into usual database queries and the queries are run against the database to retrieve all corresponding messages. This technique might work fine in certain scenarios: For example, if subscriptions do not have to be considered in "real-time" the broker can periodically work on the subscriptions, i.e. when a bulk of new messages has been materialized in the database.

4.3 Inverting the Relationship of Message Publication and Subscription Requests The current invention transforms the subscription problem into a database query problem allowing to use query techniques known and optimized for many years. Even when messages are not made persistent on disk, query technologies according the current teaching can be applied by considering messages and subscriptions as data in main memory databases.

The basic approach of the current invention is to invert the relationship of message publication requests (treated as database data) and message subscription requests (treated as database queries). Thus the core of the current invention is to treat incoming message publication requests as database queries and to treat message subscription requests as database data.

Such an approach is counterintuitive as a message subscription inherently comprises the semantics of an "inquiry", a "filter", "question" and therefore a "query" for a specific type of information, a message. A message on the other hand inherently is of the nature of a data element, as it represents this type of information the subscriber is interested in and which will be sent to the subscriber.

The current teaching is depicted in FIG. 3. According the current teaching, the messaging system or message broker comprises a database schema which reflects the possible types of subscriptions which can be requested from the message broker. This database schema may depend on the message types published to the broker. Each subscription request received by the broker is transformed into a collection of tuples and stored in the database as database data (301). Without loss of generality one may exploit an underlying relational database being one of the most popular database concepts. Nevertheless the invention may also be based on other data models and database systems. Furthermore, the database must not be persistent, i.e. it may be a main memory database in case no warehousing is required. various mechanisms exist how to transform queries into tuples. As an example the teaching of F. Leymann, UDH: A universal relation system, Data & Knowledge Engineering 5 (1990), pp. 2–38 may be exploited suggesting for the individual predicates a linear representation comprising the search conjunctions and tuple conjunctions. This invention does only assume the existence of one transformation technique, which can be applied, and does not depend on a special one chosen.

Whenever a message is published, the broker transforms the message into a query (302). This query is performed on the subscription database and its answer set is the collection of subscriptions under which the message qualifies (303). The applications having made the retrieved subscriptions are identified and receive the message in the requested format.

4.4 Value of the Current Approach

The current invention reduces subscription processing as defined in these messaging environments to query processing known since many years from the field of databases.

Existing query techniques, implementations, and database systems can be used to perform publish/subscribe in messaging system and message broker environments. For a broad spectrum of business problems, no new algorithms must be invented and existing implementations can be reused. In warehousing environments this teaching is much more efficient than the implementations being done without query processing technology in mind.

What is claimed is:

1. A messaging system comprising:

first receiving means for receiving a message-publication-request comprising a message to be published;

second receiving means for receiving one or more message-subscription-requests comprising a query on a message; and a database, said second receiving means treating said message-subscription-request as database data and storing said message-subscription-request to said database, and said first receiving means treating said message-publication-request as a database-query and retrieving from said database a collection of message-subscription-requests qualifying under said database-query.

2. Messaging system according to claim 1, wherein said second receiving means transforms said message-subscription-request into a database data representation.

3. Messaging system according to claim 1, wherein said first receiving means transforms said message-publication-request into a database-query.

4. Messaging system according to claim 1, wherein said first receiving means stores said message into said database or into a separate message-database.

5. Messaging system according to claim 1, wherein said messaging system is a message broker and/or wherein said database is part of a message warehouse.

6. Messaging system according to claim 1, wherein said database is stored in main memory and/or on persistent memory.

7. Messaging system according to claim 6, wherein said database is a relational database or a hierarchical database or a network database or an object-oriented database or a collection of flat files.

8. Messaging system according to claim 1, further comprising sending means for sending said message to subscribers of said collection of message-subscription-requests.

9. A method of processing a message-publication-request comprising a message to be published, and one or more message-subscription-requests comprising a query on a message, said method comprising the steps of:

treating said message-subscription-request as database data and storing said message-subscription-request to a database; and treating said message-publication-request as a database-query and retrieving from said database a collection of message-subscription-requests qualifying under said database-query.

10. Method according to claim 9, further comprising a step of transforming said message-subscription-request into a database data representation.

11. Method according to claim 9, further comprising a step of transforming said message-publication-request into a database-query.

12. Method according to claim 9, wherein in said step of treating said message-subscription-request as database data, said message is stored into said database or into a separate message-database.

13. Method according to claim 9, wherein said method is executed by a message broker and/or wherein said database is part of a message warehouse.

14. Method according to claim 9, further comprising a step of storing said database in main memory and/or on persistent memory.

15. Method according to claim 14,
wherein said database is a relational database or a hierarchical database or a network database or an object-oriented database or a collection of flat files.

16. Method according to claim 9, further comprising a step of sending said message to subscribers of said collection of message-subscription-requests.

17. Messaging system according to claim 2, wherein said first receiving means transforms said message-publication-request into a database-query.

18. Messaging system according to claim 17, further comprising sending means for sending said message to subscribers of said collection of message-subscription-requests.

19. Method according to claim 10, further comprising a step of transforming said message-publication-request into a database-query.

20. Method according to claim 19, further comprising a step of sending said message to subscribers of said collection of message-subscription-requests.

* * * * *